United States Patent Office 3,509,538
Patented Apr. 28, 1970

3,509,538
COMPOSING MACHINE COMPUTER CONTROL SYSTEM
Gean W. Holden, Trenton, and Paul Sternberger, Parlin, N.J., assignors to Dow Jones & Company, Inc., New York, N.Y., a corporation of Delaware
Filed July 11, 1967, Ser. No. 652,562
Int. Cl. H04q 5/00
U.S. Cl. 340—163
10 Claims

ABSTRACT OF THE DISCLOSURE

A publishing system employing a central station and a number of remote or satellite stations, in which each remote station has a number of composing machines to be simultaneously operated for composing different articles or stories supplied from the central station. Each satellite station is provided with a control unit including a relatively small capacity memory for storing coded signals representing characters of a selected portion of each such article. There is also provided at each satellite station an interface circuit between the composing machines and the control unit which operates to inform the control unit that a composing machine is ready to compose a character, and to convey from the control unit to the ready composing machine coded signals representing the next character to be composed. While coded signals are being supplied by the control unit to the composing machines, the control unit requests from the central station additional coded character signals representing subsequent portions of the articles being composed, the coded character signals representing the entire article being stored at the central station along with those of a number of different articles.

BACKGROUND OF THE INVENTION

In certain types of publishing enterprises it is desirable to have various local or regional editions of a periodical such as a daily paper, the various editions being different from one another in certain respects; for example, advertising and news content may differ between various editions. However, such separate editions contain much subject matter that is common to all or common at least to several of the separate editions. Particularly, where daily issues are involved, it is necessary that the separate editions be printed at geographically separate locations and that the composition also be carried out at such separate locations; therefore, it is desirable to supply the subject matter common to each edition from a common source, and to provide a common point of control for the composition of common subject matter.

In conventional systems, the common control of composition at a plurality of separate locations is achieved by one of a number of arrangements. In a first one of these, the content of the common subject matter is sent by telegraph from the control center to the various satellite composing points. In a second and somewhat more expeditious process, the common subject matter is transmitted from the control center in coded form, for example, as binary signals of the telegraph type, to be used at the satellite locations for the preparation of punched tape that can be directly employed for controlling the operation of automatic composing machines such as linecasting machines. The operation of linecasting machines under the control of punched tape is described in a number of patents; for example, see United States Patent 2,846,055 issued to J. J. Ackell on Aug. 5, 1958.

While the above mentioned punched tape arrangement has many obvious advantages, it also possesses many inherent shortcomings. This is particularly true where a number of different articles are originated at the central station at substantially the same time, and which it is desirable to have composed substantially simultaneously on separate composing machines at one or more of the satellite locations. In a system requiring the preparation of a punched tape for each composing machine, the achievement of such an objective would require a separate transmission channel for the coded signals for each article. Since the transmission time for the signals can be and normally is much shorter than the operating time for the composing machines, the result would be that costly transmission channels would be idle for long periods. A further shortcoming is the fact that in the prior arrangement each separate article must be stored in its complete form at each satellite station. This requires a rather large overall storage capacity even if one of the more economical types such as punched tape is utilized.

SUMMARY OF THE INVENTION

To overcome these shortcomings the system of the present invention provides at a central or control station a large capacity storage facility in which there can be stored coded signals representing the characters and various composing operations for a large number of articles that are to be simultaneously composed by the composing machines at one or more of the satellite operating locations for each of the various editions. As a result, it is sufficient to provide a relatively small capacity storage facility at each of the satellite operating locations: all that is needed at any one satellite point is sufficient storage capacity to maintain all the composing machines in continuous operation at that location. By way of example, for composing machines of the linecasting type, it is sufficient to provide at an operating location a storage facility with the capacity to store signals representing the characters of two successive lines or segments of type for each machine at that location. Half of the capacity of this storage facility will be for signals representing the line of type which the machines are composing at any particular time and which will be read out of storage as the composing machine operates. The second half of the storage capacity will be for the signals representing the next succeeding line of type to be composed by the machines, the signals for which are being received from the central station while the next preceding stored line is being composed. When the first half of the storage capacity is empty, the composing machines operate on the character signals in the second half, and a request is sent to the central station for transmission of the character signals representing the next succeeding line of type. Since the rate at which character signals can be transmitted from the central station to a satellite station may be very much greater than that at which characters can be composed, a relatively small capacity transmission channel suffices for transmitting from the central station to an operating location signals representative of succeeding lines of type for each of a number of composing machines at that location.

The storage facility at the central station is preferably provided by an all-purpose computer or data processor. On the other hand, the storage facility at a satellite operating station is preferably provided by the control unit which may be either a special purpose digital device or a suitable stored program device. By using a stored program device for the control unit at each operating station, not only is the required storage provided, but the control unit is sufficiently flexible so that by appropriate programming of the device, the material can be read out of storage in a manner desired or required for operating the composing machines, and the operating characteristics of any one of a variety of composing machines can be taken into account.

A further feature of this invention is the provision of interface circuitry between the control unit and the composing machines at each satellite operating system. In operating composing machines of the conventional linecasting variety, the linecasters are arranged to be operated directly by electric currents supplied by a control mechanism such as the electro-mechanical arrangement disclosed in the abovementioned Ackell patent. As shown in that patent, the linecasting machine is operated from punched tape fed through a tape box connected to the linecaster through a multiple contact plug attached to the linecaster and which fits into an appropriate socket in the tape box. The punched tape contains character information in coded form by virtue of the presence and absence of punched holes at specified positions on the tape, the coded information being indicative of a character to be set or a machine operation incidental to the composing operation. From the punched holes electrical signals are developed on electric circuits established by finger of the tape box that explore the tape, i.e., the tape analyzer.

The system of the present invention avoids the limitations inherent in electro-mechanical devices such as the above-described tape box, by providing a linecaster interface circuit in which there is a completely electrical path for coded electrical signals supplied by the control unit for the composing machines. If desired, the interface circuit may be provided with a socket into which the same plug attached to a linecaster and used for a connection to a conventional tape box may be directly inserted, without any change or rearrangement of the circuits or apparatus of the linecaster operating mechanism shown in the above noted Ackell patent.

The interface circuit of this invention operates so that any particular composing machine may inform the control unit by a so-called flag signal that it is in condition to handle the next coded signal representing an additional character or further operating instructions. This flag signal is stored in the interface circuit while a sequence of operations is performed in response to the flag signal in order to furnish the associated composing machine with the next coded signal. These operations cause the particular composing machine that requires information to be identified and the next coded signal for the specified machine to be taken out of the control unit storage and transferred to temporary storage in the interface circuit. The signals so stored in the interface circuit control the establishment of electrical circuits for operating the composing machine. Simultaneusly, with the transter of a coded signal to the temporary storage, the stored flag signal is cleared or erased. After a composing machine finishes the operation indicated by the signal in temporary storage, a subsequent flag signal from the same composing machine is transmitted to the interface circuit and stored in the circuit register to start the next operating cycle, and to clear the temporary storage readying it for receipt of the next coded signal.

BRIEF DESCRIPTION OF THE DRAWING

These and other objects, features, and advantages of the invention will appear more fully from the following more detailed description of a preferred embodiment of the invention as illustrated in the accompanyig drawings in which:

FIGS. 2 and 3 are schematic diagrams largely in block form, which, with FIG. 3 placed horizontally below FIG. 2, show the linecaster interface circuit;

DESCRIPTION OF PREFERRED EMBODIMENT

Complete system

Figure 1:
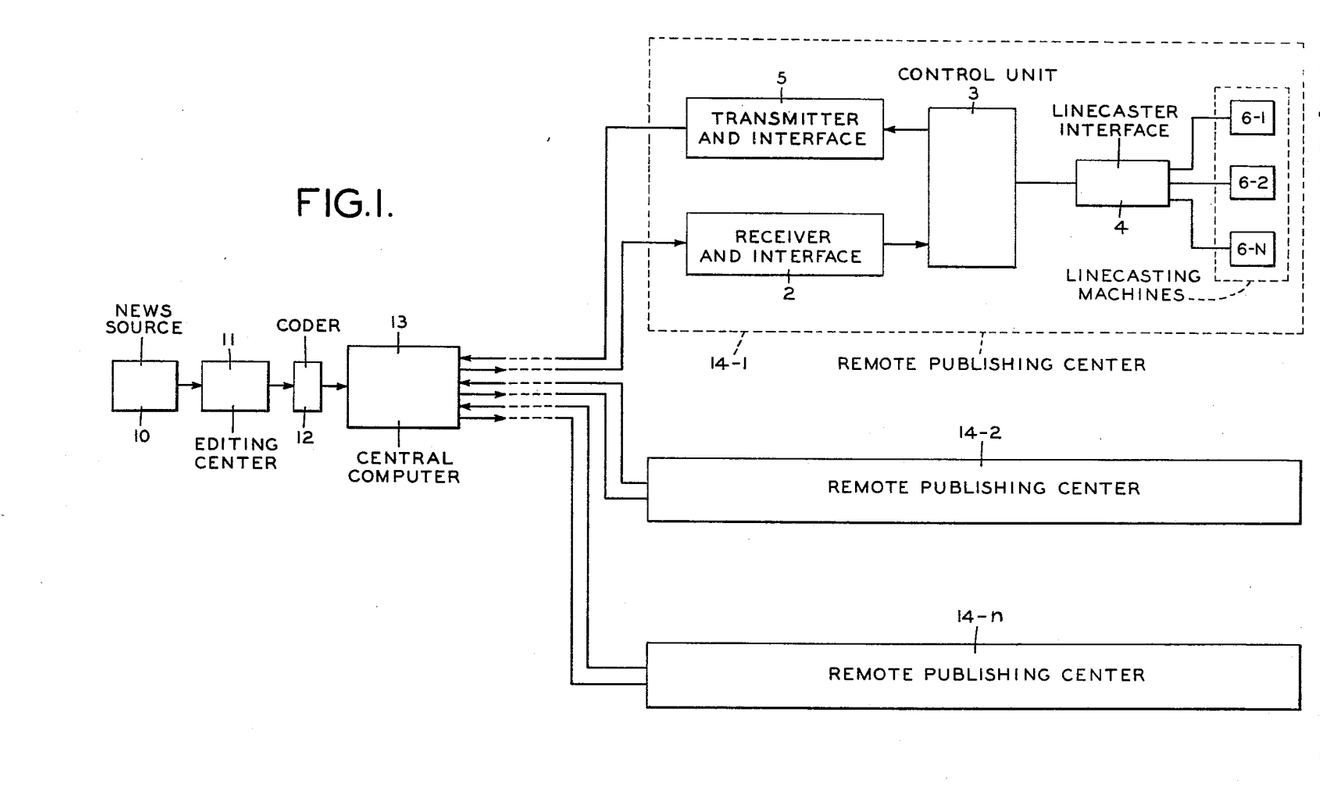
FIG. 1 is a block schematic diagram of a complete communication or publishing system illustrating one embodiment of the invention.

FIGURE 1 shows a preferred embodiment, in block schematic form, of a complete communication or publishing system operating in accordance with the principles of this invention. There is provided at a control station a central computer 13 which is in communication with satellite or remote control units in remote publishing centers 14–1 through 14–$n$ at $n$ different geographical locations, where $n$ is a selected positive integer greater than 1. A news story, article, page or the like, hereinafter referred to by the generic term "take," originating at a news source 10, is transmitted to the central data processor or computer 13 after it has been edited at an editing center 11 and converted to coded signals in a coder 12, each coded signal representing a character to be composed by a composing machine. These coded character signals, which are referred to as "coded signals," "character signals" or "coded character signals," may be either in the form of mechanical signals represented by punched holes in tape of the type used for automatically operating composing machines, or preferably in accordance with this invention, in the form of binary digital electrical signals. In either case, the signals will follow a code system known in the art for automatically operating composing machines; an example of one such system is disclosed in the above-mentioned J. J. Ackell patent. The coding process will preferably include justification and hyphenation of the raw type setting data supplied from editing center 11. It is well known that this last step can be performed either manually or by computer techniques.

The coded character signals developed by the coder 12 are stored in a suitable storage facility, which may be either the storage portion of the computer itself or a suitable random access device, to await subsequent relay to the remote publishing centers 14 as requested by the individual centers. The capacity of the storage facility may be made sufficiently large so that it can contain not only the information from a single take from source 10 but also information for all other takes that are to be more or less simultaneously composed at the remote publication centers.

The central computer 13 is connected to each of the remote publishing centers by means of a communication channel capable of transmitting data in the form of binary digital signals in either direction. This not only permits the transmission from the central computer of the stored character signals and other operating instructions to the various remote publishing centers, but also permits the remote centers to request character data from the central computer as required.

At each of the remote publishing centers, as exemplified by center 14–1, there is provided a remote control unit 3. Because a complete take for each composing machine is stored in the central computer 13, it is only necessary to store in the remote control unit at each publishing center sufficient information to maintain in operation all of the associated composing machines at a particular center. In a preferred embodiment of this invention, where the composing machines are linecasting machines, the necessary operating information to be stored in a remote control unit is the information for at least a single line or segment of type. Preferably, additional stoarge capacity for a second line of type for each machine is provided. In this way, the linecasting machines may be kept in substantially continuous operation, since the storage facility for one line of type may be replenished from the central computer while the coded signals in the storage facility for the other line of type are being used to operate the linecasting machine.

In each remote publishing center, there is provided a receiver and interface 2 which supplies incoming data or signals to the remote control unit 3. As described in more detail below, the remote control unit 3 is arranged to control the operation of a number of linecasting machines 6-1 through 6-N, where N is a selected positive integer greater than one. When the information for any one of the linecasters stored in the control unit 3 has been processed, the control unit 3 relays a request for information for an additional line or segment of type to the central data processor 13 via a transmitter and interface 5, which may be of any well-known design.

An important feature of this system is the interface circuit 4 between control unit 3 and the various composing machines 6-1 through 6-n at each of the remote publishing centers. Interface 4 operates to permit any composing machine 6-1 through 6-N to inform control unit 3 by flag signal that it is in condition to receive the next set of coded signals from control unit 3.

In the example illustrated in the drawings and described herein, it has been chosen to show a system employing six linecasters controlled by the local control unit. Obviously, this number is chosen only as an example and a larger or smaller number of linecasters may be used as desired, with corresponding changes in the various circuits at each center to accommodate the number of machines actually used.

It is to be understood that amplifiers for buffering or other purposes are to be provided at various positions in the circuits shown in the various drawings, as is well understood in the art, but in the interest of simplicity of illustration and description, such conventional circuit components have been largely omitted.

Linecaster interface circuit

The system will be first described with respect to FIGS. 2 and 3 which show, with FIG. 3 placed below FIG. 2, generally in box schematic form, the complete linecaster interface illustrated as element 4 in FIG. 1 between the local control unit 3 and the six linecasters (not shown).

Control unit 3 may be any one of a number of well-known special purpose digital devices or programmed general purpose computers. For convenience, control unit 3 will be described in terms of a general purpose computer which has been programmed to carry out the specific functions to be described below.

Figure 3:
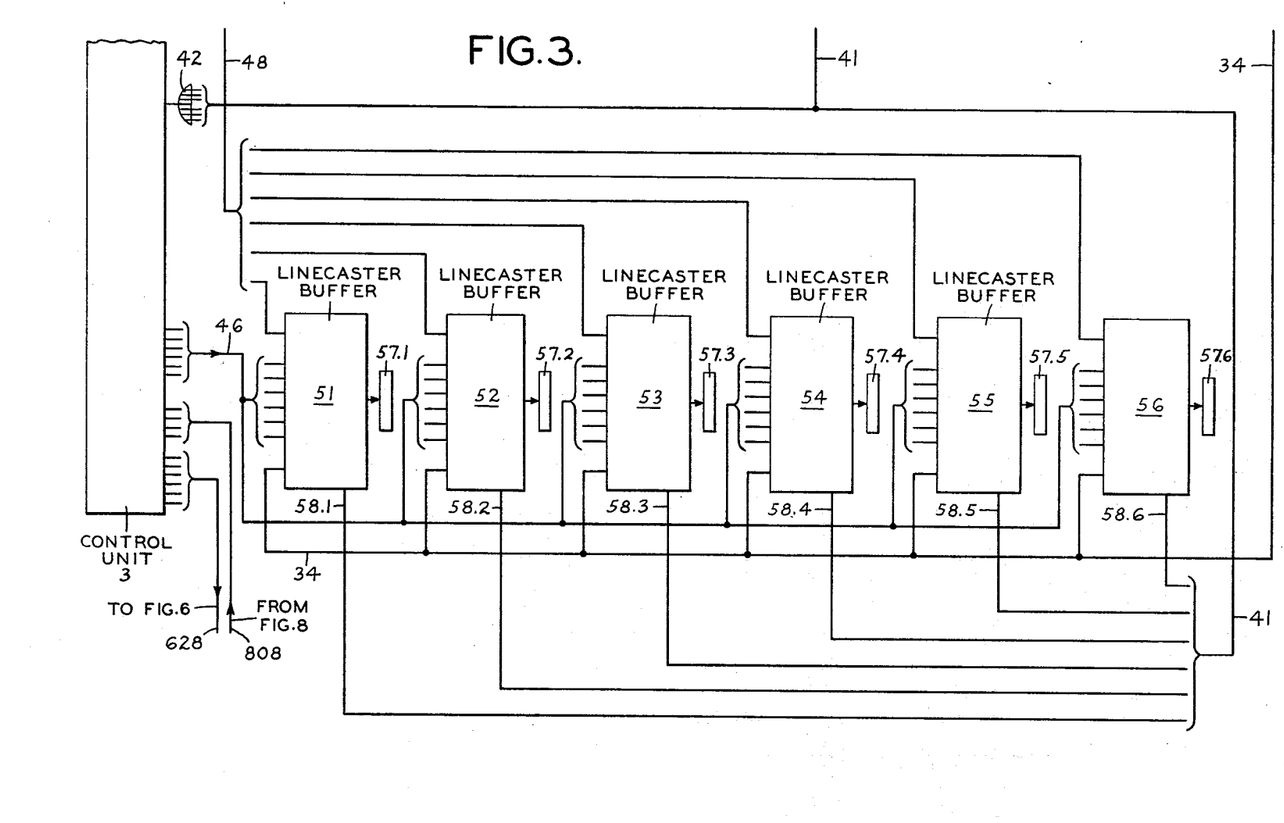

Direct connection to the linecasters is made through the linecaster buffers 51 through 56 shown in FIG. 3. The electrical connection to the linecaster systems is made through connecting devices 57. For example, connecting device 57.1 of buffer 51 may be a multiple socket of well-known construction designed so that a multiple contact plug of the appropriate linecaster system fits directly into this socket, where the plug may be of the type shown in the above noted Ackell patent.

The overall operation of the system will be described at this point, followed by a description of the schematic of the interface circuit and its relation to the overall operation, and finally the individual circuits of the various components of the interface circuit will be explained.

When a linecaster is ready for a character from control unit 3, either when first starting its operation or when during its operation it has set up or composed the last character received from the control unit, it informs or signals the control unit of its readiness for the next character. In the embodiment shown in detail here, this is done by establishing an electrical condition which will be referred to as flagged or setting a flag signal. Such a flag signal will be stored in the flag register of the respective linecaster buffer as will be described in detail hereinafter. Such a stored flag signal appears at the flag output terminals 58.1 through 58.6 of the respective buffers 51 through 56, for example, as a logical one pulse. Obviously, the logical one and the logical zero pulses referred to herein may be of any desired polarity or value. In the preferred embodiment illustrated herein, a logical one pulse may be represented by a signal of negative three volts and a logical zero pulse by zero volts, i.e., a ground connection. These flag signals are fed through cable 41 to the respective AND gates of the gating unit 60 (FIG. 2), and simultaneously in parallel to control unit 3 through OR gate 42 (FIG. 3).

The appearance of a flag signal at control unit 3 from the output of the OR gate 42 causes the control unit to start a series of programmed operations for supplying the proper information to the appropriate linecaster. These operations are briefly:

First: The interruption of any other operation in which control unit 3 may be engaged at the moment.

Second: The starting of an operation for determining which of the linecasters has established a flag signal, indicating that it is in condition to receive and compose a character.

Third: The reading of the memory of control unit 3 for the signals representing the next character to be composed by the particular linecaster and passing such signals on to the character registers of the proper linecaster buffer 51 through 56.

Fourth: The releasing of the character signals from the buffer character register to the specified linecaster.

The first step is entirely an internal operation of control unit 3 and need not be described here. In the second step, control unit 3 initiates the operation of determining which linecaster is flagged by sending a succession of scanning signals, each of which may be in the form of a three digit binary signal, over a cable connection 43 shown in FIG. 2 through a noninverter-inverter network 90 to flag scanner 70 and linecaster selector 80. Simultaneously, control unit 3 initiates a flag search command by establishing a logical one on the cable connection 44.

As will be described in detail in connection with FIG. 4, these binary signals operate the scanner 70 in successive steps to examine in turn each of the flag signal leads of the cable 41, and simultaneously operate linecaster selector 80 in successive steps. When scanner 70 finds a unit of the multiple AND gate 60 which has a flag signal from one of the connections of cable 41, a logical one output signal will be produced or gated from the appropriate AND gate. Such signals are transmitted through the OR gate 61 to the AND gate 62 which has already been enabled by the flag search command signal on lead 44, thus producing a logical one output on lead 45 which is transmitted back to control unit 3 as a "skip" command signal. This "skip" command causes control unit 3 to stop further generation of scanning signals and maintains the scanning signals on the leads of cable 43 in the configuration at which a flag signal was detected, thereby to identify the flagged linecaster and interrupt further scanning. In other words, further generation by control unit 3 of three digit binary signals for the scanning operation is stopped and this action will provide information within the control unit as to which linecaster is flagged and cause the control unit to read from its memory the appropriate signals for the next character to be supplied to the identified linecaster.

In general, character signals to be sent out by control unit 3 are first transferred from its memory to an output driver, for example, an accumulator or output bus in the control unit (not shown). Such character signals will be transmited over the cable connection 46 (FIG. 3) and made available for storage in the character register of the appropriate linecaster buffer 51 through 56, as will be determined by a gating signal from the linecaster selector 80 (FIG. 2).

Simultaneously with the stopping of the flag scanner 70 on detecting a flag signal, the linecaster selector 80 is stopped. Consequently, on detection of a flag signal both the scanner 70 and the selector 80 will be stopped at the same relative position corresponding to that linecaster which is flagged. After control unit 3 establishes character signals on the cable circuit 46 (FIG. 3), control unit 3 sends out a selector command signal over the cable connection 47 (FIG. 2) to the linecaster selector 80. This signal releases a so-called select signal from the selector 80 which is transmitted over the appropriate lead of the cable 48 to cause the corresponding linecaster buffer of the flagged linecaster to permit the character signals appearing on the cable 46 to be stored in the register of the appropriate linecaster buffer. Such character signals are immediately transferred to the linecaster through drivers that establish electrical circuits to cause operation of the linecaster for the composition of the appropriate character.

As will be explained below in detail in connection with the description of the linecaster register or buffer in FIG. 5, the select signal from the linecaster selector 80 performs two functions in addition to that of transferring character signals from control unit 3 to be stored in the linecaster buffer character registers: (1) to complete a linecaster interlock which maintains the linecaster system in the operating condition; and (2) to reset the flag registers of the linecaster buffers thereby changing the output signal on lead 58 of the flagged linecaster from a logical one to a logical zero.

The linecaster buffer circuits 51 through 56 are also provided with facilities by which the operation of the corresponding linecaster may be interrupted by a command from the computer. Such a command is referred to herein as a "defer" signal which is a logical one signal transmitted over the lead 49 (FIG. 2) from control unit 3. This defer signal is supplied through an amplifier 31, a delay circuit 32, preferably of the monostable or single shot multivibrator type, and a second amplifier 33, all in tandem. Amplifiers 31 and 33 are each provided with two output leads, on one of which the output signal appears with the same phase as the input signal to the respective amplifier, and on the other of which it appears in opposite phase, that is, inverted polarity. In the case of the inverted output signal of amplifier 31, it is transmitted back to control unit 3 over line 35 to clear the buffer or other temporary storage device of the control unit as will be later referred to. In the case of amplifier 33, the inverted output signal is taken off the output lead 34 and supplied to all the linecaster buffers 51 through 56 for interrupting the operation of a linecaster. The operation of this signal in turning off any particular linecaster can best be understood by reference to the detailed description of the linecaster buffer circuit of FIG. 5.

Flag scanner and linecaster selector

Figure 4:
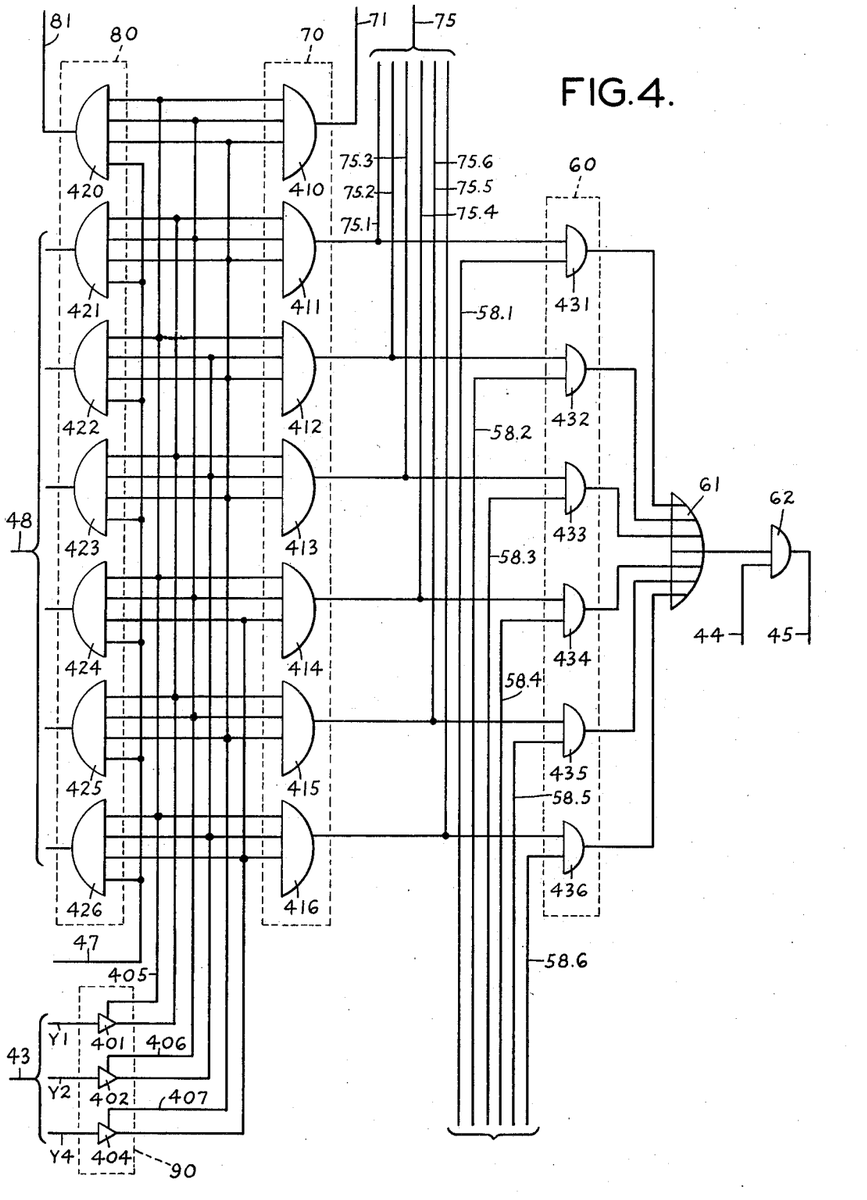
FIG. 4 is a schematic diagram of the flag scanner and linecaster selector and their associated operating circuits.

Turning now to FIG. 4, this drawing shows in detail the construction of flag scanner 70, linecaster selector 80, and their associated operating circuits. It will be recalled that scanner 70 and selector 80 are operated in response to a three digit binary signal supplied over connection 43 from control unit 3. Connection 43 includes three separate leads Y1, Y2 and Y4 corresponding to the binary digits in ascending denominational order. These leads are connected to amplifiers 401, 402, and 404 in network 90, where the amplifiers may be of the same type as amplifiers 31 and 33 shown in FIG. 2. Both the non-inverted output signals and the inverted output signals developed by amplifiers 401, 402 and 404, the inverted signals appearing on leads 405, 406 and 407, respectively, are supplied both to scanner 70 and to selector 80.

Scanner 70 includes seven AND gates, 410 through 416, each of which is provided with three input leads for signals supplied from the six output leads of network 90. The connections to these AND gates are typical of those used for stepping circuits in the binary computer art.

Thus, when the signals on leads Y1, Y2 and Y4 are all binary zeros, gate 410 will have a binary one output signal on its output lead 71. Similarly, to test for the linecaster No. 1 flag signal from the corresponding buffer 51 of FIG. 3, there will be no flag signal on the input and the leads Y2 and Y4 will both have binary zero signals. As a result, the output signal of AND gate 411 will be a logical one and this logical one signal is applied to the control terminal of gate 431 to serve as an enabling signal for gate 431. However, assuming for the moment that there is no flag signal on lead 58.1 from the buffer 51 of FIG. 3, there wil lbe no flag signal on the input terminal of gate 431 and therefore there will be no output signal from AND gate 431, hence control unit 3 will automatically step the configuration of the signals applied to leads Y1, Y2 and Y4 to the next binary number.

Thus, the next step in the scanning operation controlled by control unit 3 will establish the binary number corresponding to two by applying to lead Y1 a binary zero signal, to Y2 a binary one signal, and to Y4 a binary zero signal, thereby producing an enabling signal at the output terminal of AND gate 412 which is supplied to the upper leg or control terminal of AND gate 432. Assuming at this time that linecaster No. 2 has established a flag signal in the corresponding buffer 52 of FIG. 3 so that a logical one appears on output terminal 58.2, there will appear at the output terminal of the AND circuit 432 shown in FIG. 4 a logical one signal which will be passed through OR gate 61 to AND gate 62. It will be recalled from the previous general description of FIGS. 2 and 3 that at this time the output lead 44 from control unit 3 (FIG. 2) is at logical one representing the flag search command signal from the control unit. Consequently, a "skip" command signal will be produced on the output lead 45 of gate 62 by the simultaneous presence of a logical one signal passed by OR gate 61 and the flag search command from control unit 3, and the ship command signal will be transmitted to control unit 3 via lead 45 to halt further configuration of the signals on the leads Y1, Y2 and Y4 as previously described.

Figure 2:
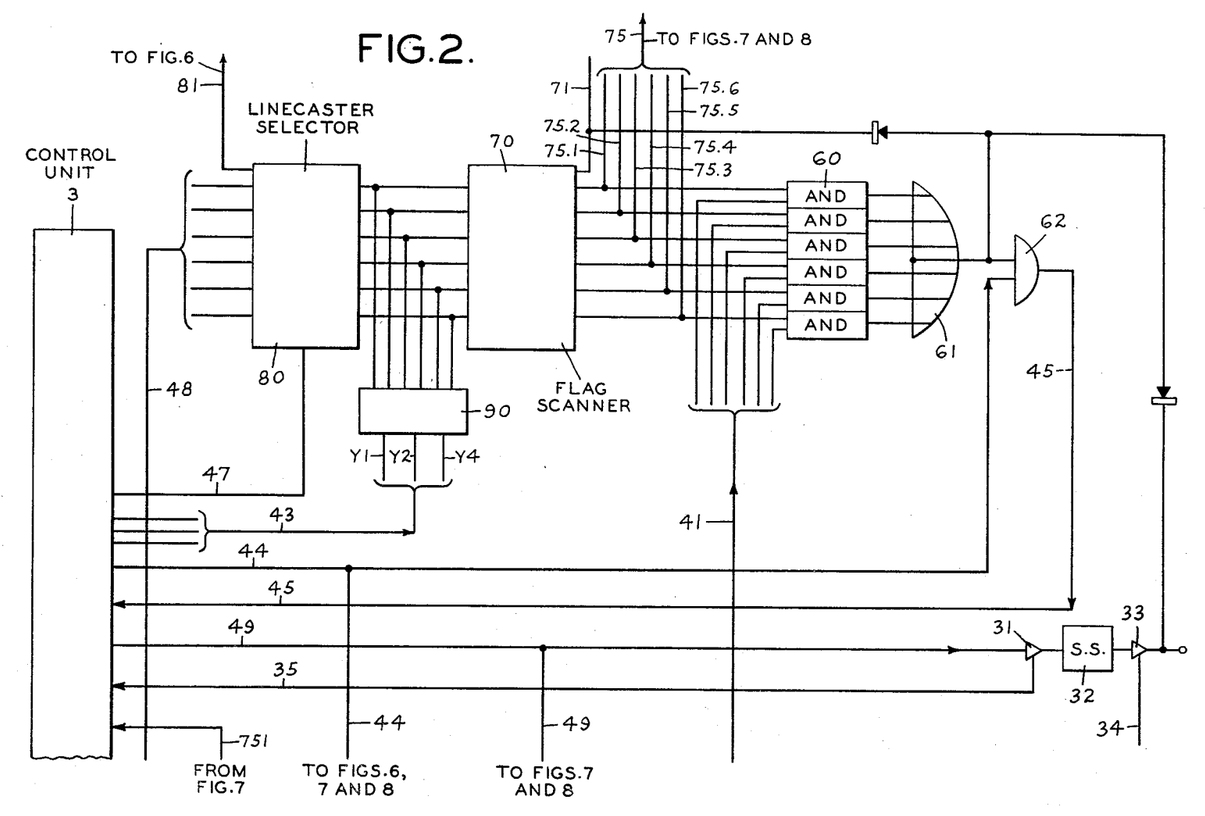

As indicated in FIG. 4 as well as in FIG. 2, there is provided a cable 75 having separate leads 75.1 through 75.6 from the outputs of the AND gates 411 through 416. These connections are provided for the operation of certain supervisory circuits to be described later. Also, there is provided a separate lead 71 from the output of AND gate 410. This is also used for the control of a supervisory circuit to be described below.

Linecaster selector 80, like flag scanner 70, comprises a series of AND gates 420 to 426. Each of these has three input leads paralleled with the three input leads to corresponding AND gates 410 to 416 of flag scanner 70, and consequently, the stepping of selector 80 is controlled in synchronism with that of scanner 70. However, AND gates 420 to 425 of selector 80 have an additional input lead connected to receive the selector command signal previously described from control unit 3 over lead 47. As a result, no selector output signal can be obtained from the AND gates 420 through 426 until the selector command signal is established on lead 47, for example, at logical one. As previously described, this selector command signal is established by control unit 3, after receipt of the skip command signal from AND gate 62, to supply the character signals to the character registers of the linecaster buffers 51 through 56. The selector command signal is established after the character signals are transferred from the memory to an output driver of the control unit.

As described in connection with FIGS. 2 and 3, the output signals of linecaster selector 80, namely, that of the AND gates 421 through 426, are supplied through the leads of cable 48 for control of the linecaster buffers. The output of AND gate 420 is supplied over lead 81 to a supervisory circuit to be described later.

Linecaster buffer

Figure 5:
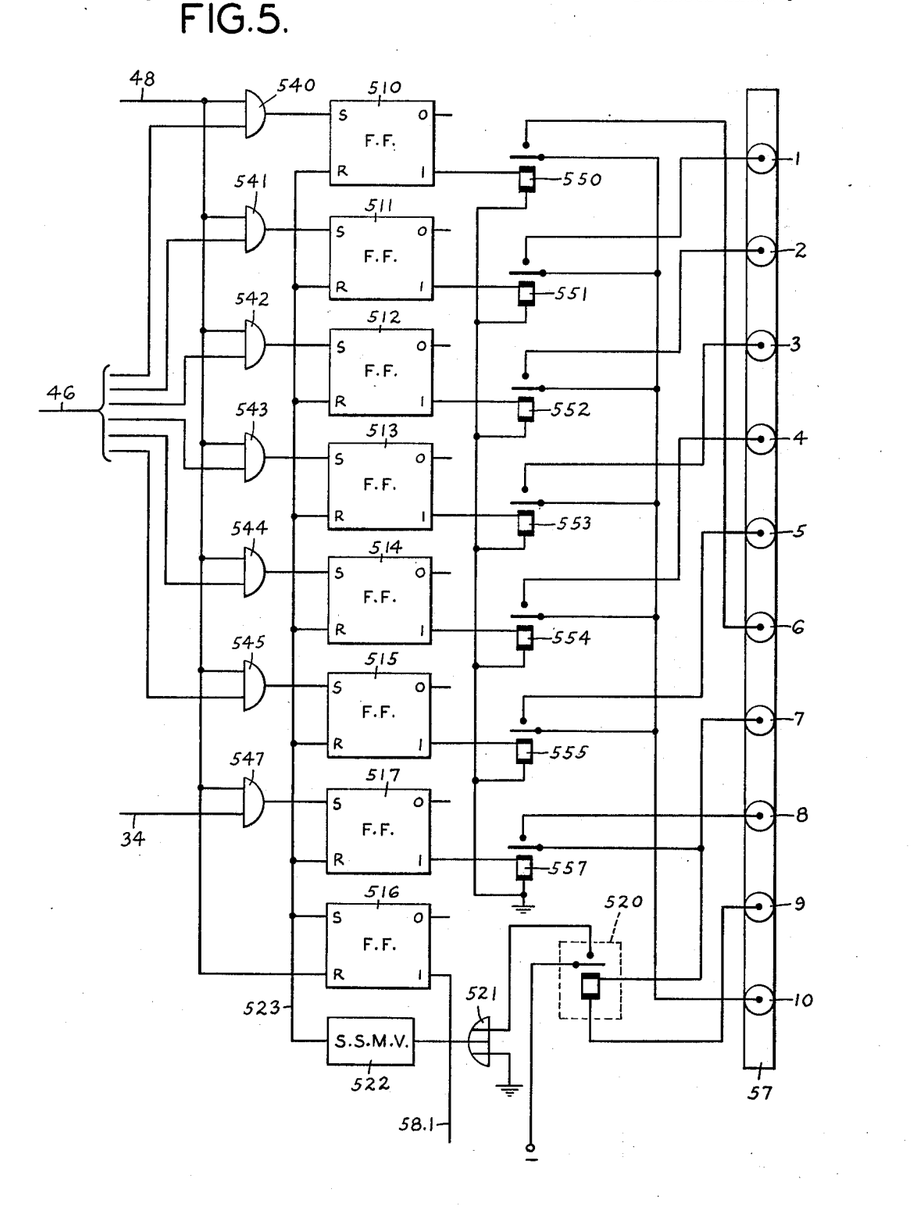
FIG. 5 is a schematic diagram of a typical linecaster buffer.

Referring next to FIG. 5, this drawing shows in some detail the components of the linecaster buffer unit 51 which is typical of all the units 51 through 56. Flip-flops 510 through 515 collectively serve as a register for the incoming character signals from control unit 3 through cable 46, the number of flip-flops being determined by the number of digits used to represent a character. In this embodiment there are six flip-flops corresponding to the six binary digits represented by the linecaster code. A seventh flip-flop 516 serves as a register for the flag signal. An interlock to prevent operation of the linecaster under certain conditions is provided by an eighth flip-flop 517 under the control of the previously mentioned "defer" signal transmitted over lead 34 from amplifier 33 (FIG. 2). Connections to linecaster No. 1 are made through connecting device 57 having ten numbered contacts.

When linecaster No. 1 requires a character, a direct current circuit is automatically established from contact 7 of device 57 through the winding of relay 520 back to the linecaster through contact 9, thereby operating the relay 520 and closing its contacts. The closing of the contacts of relay 520 establishes a flag signal, for example, a logical one signal, through OR gate 521 to operate a monostable or single-shot multivibrator 522, and this serves to lengthen the duration of the flag signal to a predetermined time interval, say of the order of four microseconds. The resultant output pulse developed by multivibrator 522 on lead 523 sets flip-flop 516 thereby to register on lead 58.1 a flag signal for the corresponding linecaster and its buffer 51. This registered flag signal is transmitted to other portions of the interface through the connections 58.1 in the manner previously described with respect to the overall schematic block diagram of FIGS. 2 and 3.

The output signal on lead 523 is also supplied to the reset terminals of the character signal register comprising flip-flops 510 through 515 to clear the character register and prepare it for the reception of signals of a subsequent character. The signal on the lead 523 also resets the interlock flip-flop 517 for the operation of the interlock circuit as will be described in detail below.

The AND gates 540 through 545 are provided for supplying the individual binary digits of the incoming character signal to the respective register flip-flops 510 through 515. These character signal digits are supplied through the cable 46 from the control unit 3 as was previously described. The other input to each of the AND gates 540 through 545 is the select signal which comes over the appropriate lead of the cable 48 from the linecaster selector 80 so that the character registers of only that linecaster buffer that has been determined to have its flag set are activated for the storage of the character signal digits.

The incoming signals on the cable leads 46 from the control unit 3 are the binary digits that represent, in the chosen code, the character to be set by the linecaster or the composing functions to be performed thereby. Those leads which for any particular character or machine operation are binary ones set the corresponding flip-flops 510 through 515. Such flip-flops that are set in turn actuate the corresponding driver relays 550 through 555, and the actuation of any driver relay completes a connection from terminal 10 of socket 57 to the appropriate terminals 1 through 6 of the same socket and completes a circuit in the linecaster, for example, a digit circuit as shown in the above mentioned Ackell Patent 2,846,055. The completion of the digit circuit causes the configuration of the flip-flops 510 through 515 to be transferred to the linecaster and thereby control its operation. The use of this relay inter-connection provides complete electrical isolation between control unit 3 and the linecaster.

As mentioned above, in addition to controlling the transfer of character digits from control unit 3 to the proper linecaster through the corresponding linecaster buffer, the select signal from linecaster selector 80 performs two other functions. First, in combination with a command from the control unit, it completes the linecaster interlock. Second, it resets flip-flop 516 to erase or clear the flag signal of the particular linecaster thus permitting control unit 3 to service another linecaster. This latter circuit is self-evident and will not be discussed in further detail.

As previously briefly referred to in connection with FIGS. 2 and 3, in the absence of the "defer" signal on output lead 49 of control unit 3, the lead 34 will be a logical one and will enable the AND gate 547, thereby permitting the selector signal on lead 48 to set the flip-flop 517. Relay 557 is operated by the setting of flip-flop 517, closing its contacts and completing the interlock circuit between terminals 7 and 8 of device 57 to render the linecaster operative. The flip-flop 517 remains set, thereby maintaining the linecaster operative, until the flip-flop 517 is reset in response to a flag signal. The connections through terminals 7 and 8 of device 57 may be the same as those shown in the Ackell patent as part of the circuit for a main control relay, wherein opening the circuit between terminals 7 and 8 prevents the energizing of the matrix releasing solenoids and stops the operation of the linecaster system.

If control unit 3 determines that it has no more information for a particular linecaster which has requested such data by establishing its flag signal, the control unit establishes a defer signal on line 49 of FIG. 2, namely, a logical one. The resulting inverted output on lead 34 from amplifier 33 (FIG. 2) will be a logical zero. This results in the blocking of AND gate 547 so that flip-flop 517 will not be set and the interlock will remain open rendering the linecaster inoperative. Since the opening of the contacts of relay 557 opens the circuit of the main control relay of the linecaster (as referred to above), the circuit for relay 520 is also open and no flag signal can be set up on the linecaster buffer. Thus, when the linecaster is put out of operation by the defer signal, the operation of the control unit will not be interfered with on each machine cycle of the linecaster because of the appearance of a flag signal. The linecaster can be brought back into operation by a suitable command from the control unit.

The control unit is programmed to remember that it had a flag signal from a particular linecaster whose operation was subsequently deferred. As a result of this memory, the control unit will, on receipt of the next character for that particular linecaster, step the linecaster selector 80 to the proper position and supply the character signals to the linecaster buffer. The output signal of linecaster selector 80, in addition to steering the character signals to the proper linecaster buffer, will restore the interlock circuit via lead 48 to set flip-flop 517 and thereby render the linecaster control operative.

In addition to programming control unit 3 to establish the "defer" signal to indicate the lack of further data, the "defer" signal may be established manually to shut down a linecaster for servicing or repair.

In connection with certain of the supervisory operations to which reference will be made below, the "defer" signal will provide a part of the command.

It is provided for local control unit 3 to cooperate in the performance of certain supervisory operations, and in connection with these operations, the defer signal will provide part of the command by which the operation is performed. These operations are three in number, namely:

(1) Generation of a "need a take" signal for the supervisory operator by which he is informed that the central computer 13 contains no more information to be sent to a particular one of the linecasters.

(2) Supplying to central computer 13 information with respect to the position of the mold disk of each linecaster.

This operation, like the third operation to be later described, is one in which the central computer is used to analyze the present conditions of the linecasters.

(3) Supplying to central computer 13 a "stop at end of take" signal. Also, control unit 3 surveys the linecasters, this time to determine which if any have been set up by an operator to be taken out of operation at the end of the particular take that it is presently composing.

"Need a take" circuit

Figure 6:
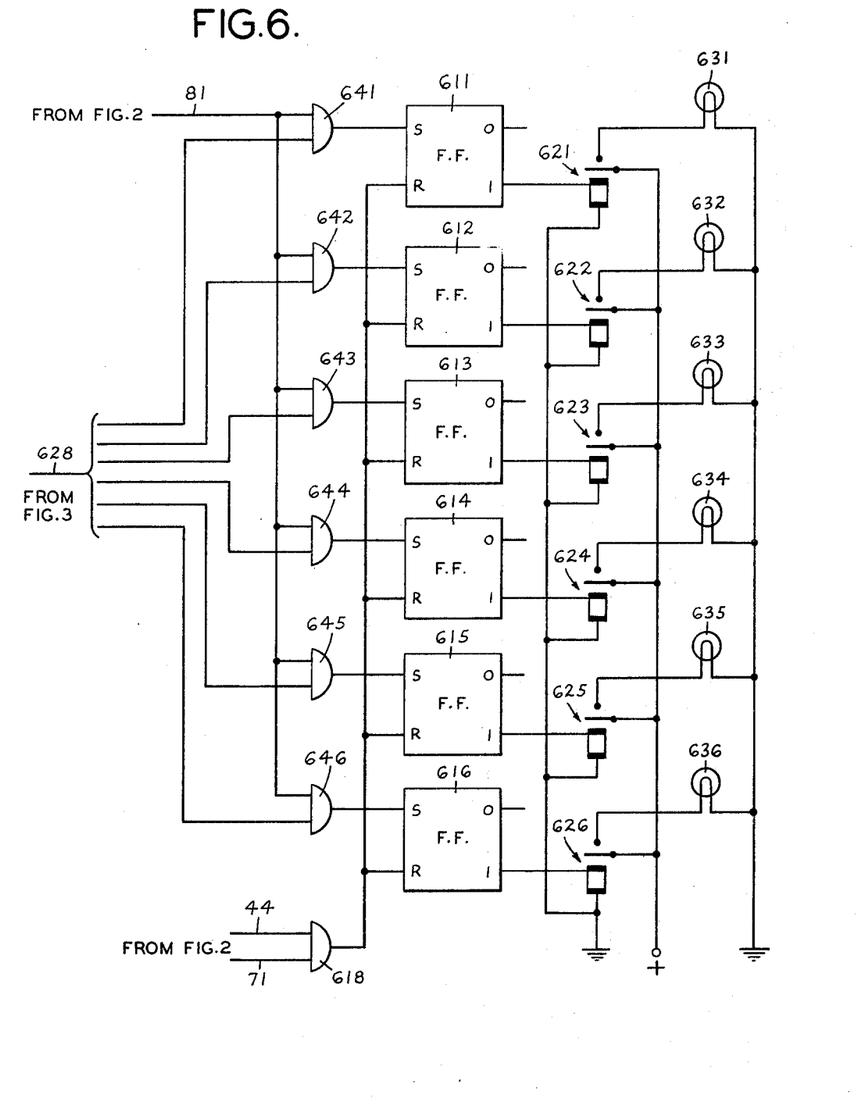
FIG. 6 is a schematic diagram of the circuit for the "need a take" indication.

As indicated, when the memory of central computer 13 contains no more data for one or more of the linecasters, control unit 3 sets up three command signals for the operation of the "need a take" circuit with the result that the operator is informed of that particular condition. In addition, control unit 3 sets up so-called temporary storage bits on output lead 628 (FIGS. 3 and 6), each of which corresponds respectively to one of the linecasters. Thus when central computer 13 contains no more character information for a particular linecaster, the corresponding temporary storage bit signal, which may be set at logical one, appears on a designated one of the leads of cable 628 (FIGS. 3 and 6). At the same time, the scanning signal on the Y leads of cable 43 from control unit 3 (FIGS. 2 and 4) is established at binary zero, the flag search command signal on lead 44 from control unit 3 is set at logical one, and after a proper delay, the selector command signal on lead 47 is set at logical one.

As a result of the Y leads of the cable 43 all being at binary zero, both flag scanner 70 and linecaster selector 80 will be in the zero position and a logical one signal will appear on lead 71 of scanner 70. Also, after the indicated delay, the selector command signal on lead 47 causes a logical one signal to appear on the output lead 81 from the linecaster selector 80.

The circuitry for establishing a "need a take" signal for the operator is shown in FIG. 6. This circuit, like those of FIGS. 7 and 8, has various interconnections with the operating circuits of FIGS. 2 and 3. The circuit of FIG. 6 responds to the three commands from control unit 3, and the temporary storage bits which have been established to reflect the condition of the memory with respect to character information available for the respective linecasters.

The "need a take" circuit comprises six flip-flops, 611 through 616, corresponding to the six linecasters assumed to be present throughout this description. Each of these flip-flops has its "one" output lead connected to the winding of corresponding lamp driver relays 621 through 626. The contacts of these relays are connected so that the operation of any relay establishes a circuit for lighting the respective one of the signal lamps 631 through 636. These signal lamps correspond to the linecasters and the lighting of any one or more of the lamps provides a "need a take" signal to inform the operator that control unit 3 requires information for continuing the operation of such linecaster or linecasters.

The operation of the circuit of FIG. 6 is as follows. The delayed logical one flag search command signal from control unit 3 over connection 44 is transmitted through the AND gate 618, since gate 618 has been just previously enabled by the logical one signal on lead 71 from flag scanner 70 (FIG. 2) in response to the configuration of the all zero scanning signals on cable 43, just described. The output of AND gate 618 resets each of the flip-flops 611 through 616 from the condition at which it was established for the previous "need a take" cycle. Any logical one temporary storage bits generated by control unit 3 are transmitted over the conductors of cable 628 through the respective AND gate 641 through 646 to the set terminals of flip-flops 611 through 616. The other input terminals of the AND gates 641 through 646 are multipled to output lead 81 from linecaster selector 80 (FIG. 2). When the signal on the connection 81 is established at a logical one by the final selector command on lead 47, all of the AND gates 641 through 646 are enabled so that any of the temporary storage bits transmitted over the corresponding lead of cable 628 will set the respective flip-flop and operate the line driver relay to light the respective "need a take" lamp, giving the operator the required information.

Mold position indicator circuit

Figure 8:
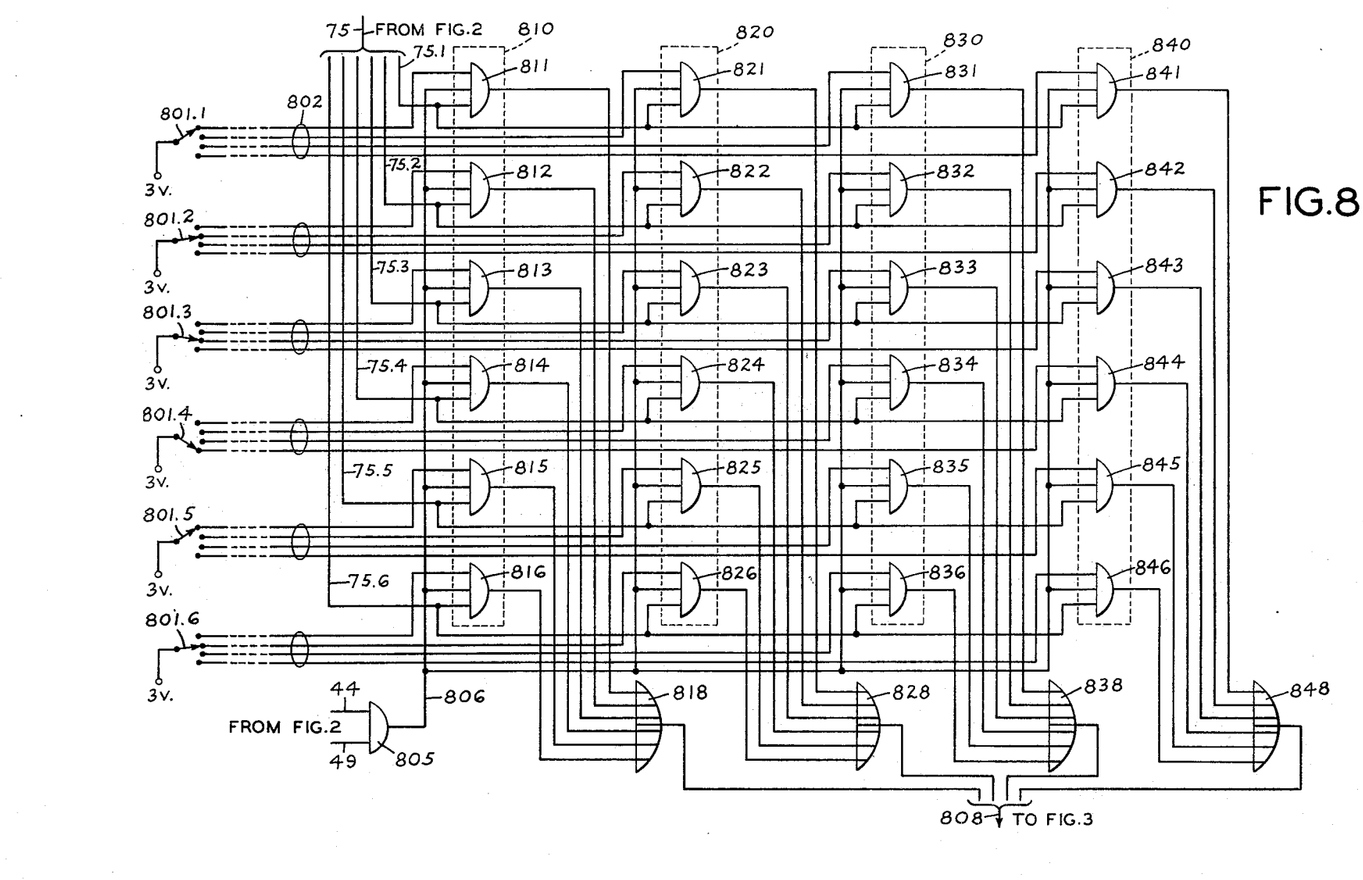
FIG. 8 is a schematic diagram of the circuit for the mold position indication.

Each linecaster has a mold disk, which in the specific example described herein supports four type casting molds. A manual adjustment is provided for selecting that one of the four molds required for any particular composition. This will depend of course upon various factors such as the size of the type, length of the printed line, and the like, required in any particular situation. Also associated with the mold disk is a four-position switch which provides an indication over an electrical circuit as to which of the four molds is in use for the particular composition. This arrangement, except for the switch, is not illustrated in the drawings, but is typical of linecaster construction. One example is described in a book entitled, "Linotype Machine Principles," published by Mergenthaler Linotype Company, Brooklyn, N.Y. (1940), particularly in chapter 12.

In FIG. 8, switch 801.1 represents the mold position switch for linecaster No. 1. The four contacts of this switch are connected over a cable 802 to supply a mold position signal to the four mold position switch sensor circuits 810, 820, 830, 840. Switches 801.2 through 801.6 for the other linecasters are shown but will not be described, since their operation is identical with that of switch 801.1.

The mold position switch sensor circuits for testing the switches each comprises a bank of six AND gates each. Each bank corresponds to one mold position and the six AND gates of each bank correspond to the six linecasters. Thus, AND gates 811, 821, 831, 841 correspond to the four mold positions for linecaster No. 1, and similarly for each of the other linecasters.

Like the "stop at end of take" circuit to be described later, the mold position circuit is commanded from control unit 3 for individual testing of the mold positions of the linecasters. The commands for the two circuits are the same and in fact the interrogations for the position of "stop at end of take" switches and the mold switches may be carried out simultaneously.

For this purpose, logical one signals are transmitted from the control unit through both lead 44 and lead 49, and the Y1, Y2 and Y4 leads of cable 43 are supplied with the proper binary digits to determine which of the linecasters is being tested for any particular command.

In order to put the circuit into operation, the logical one signals over the leads 44 and 49 are supplied to the inputs of an AND gate 805. The resulting logical one signal on the output lead 806 of this AND gate is supplied in parallel to one of the two control terminals of the AND gates of all four banks 810, 820, 830 and 840. This will initiate the enabling of these AND gates so that when completely enabled by the additional signal supplied to the other control terminal from the output signals of flag scanner 70 over the cable 75 the condition of the mold switch of the selected linecaster will be tested.

By way of example, if the scanning signals transmitted over cable 43 from control unit 3 to the interface circuit are such as to produce a logical one output from AND gate 411 of linecaster selector 80 corresponding to linecaster No. 1 (FIG. 4) such a signal will be transmitted to the gates 811, 821, 831 and 841 over lead 75.1 of cable 75 so that they are responsive to the mold position signal on the cable 802 from the linecaster No. 1. With switch 801 in the position shown, a logical one signal will be applied to the upper input terminal of AND gate 811 resulting in a logical one signal on its output terminal, which will be transmitted through OR gate 818 over the appropriate lead of cable 808 to control unit 3. This results in the storing, for example, in the form of a preassigned temporary storage bit, of the information that the mold switch under test is in the No. 1 position. The operation of control unit 3 will be such as to correlate this information with the stored information with respect to which linecaster was under test by the configuration of the signals transmitted over the cable 43. The complete information is transmitted to the computer 13 of the central station so that information at that station may be kept up to date with respect to the mold position condition of the individual linecasters at the remote publishing center.

The other OR gates 828, 838, 848 are provided for transmitting information with respect to the condition of the AND gates of the respective banks 820, 830 and 840 over the other leads of cable 808 to control unit 3. The information stored on the temporary storage bits of the control unit by the circuits of cable 808 may be utilized before the mold switch of a subsequent linecaster is interrogated. It will be observed in FIG. 2 that the signal transmitted from control unit 3 over lead 49 is returned to control unit 3 over circuit 35 to clear the temporary storage each time the mold position switch sensor circuit or the "stop at end of take" circuit is commanded.

"Stop at end of take" circuit

Figure 7:
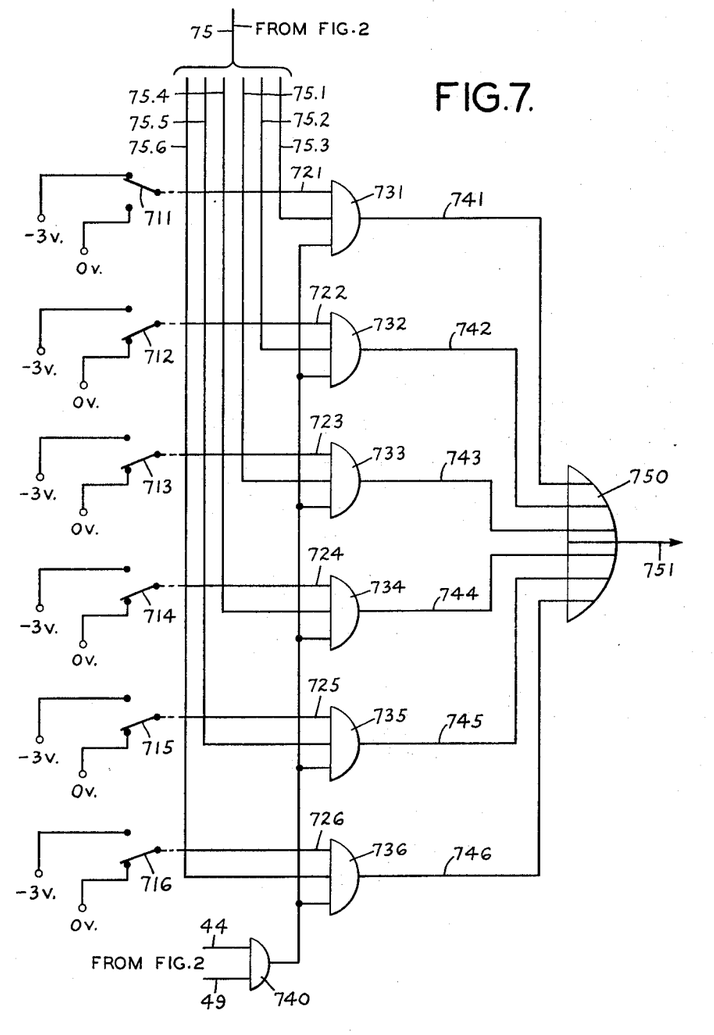
FIG. 7 is a schematic diagram of the circuit for the "stop at end of take" indication.

The "stop at end of take" supervisory function is performed by the circuit of FIG. 7. Each linecaster is provided with a switch which may be actuated by an operator to inform control unit 3 that it is desired that the linecaster be taken out of operation at the end of the take which it is at that time composing. For this purpose, a switch is closed, for example, to supply negative three volts, which is the logical one signal for the system, to a line leading to the interface circuit. Such a logical one signal will indicate that the particular linecaster has been designated for "stop at end of take."

Thus, in FIG. 7, switch 711 for linecaster No. 1 would be closed in the "stop at end of take" position to apply a logical one signal to lead 721. A similar switch is provided for each of the other linecasters. There are designated as switches 712 through 716. As shown in FIG. 7, the supervisory circuit for this function comprises AND gates 731 through 736, one for each linecaster. Each of these AND gates has three input terminals, and the lower one of these terminals is connected to the output of AND gate 740. When it is desired to investigate the condition of the linecaster switches that signify the "stop at end of take" condition, logical one command signals are sent by control unit 3 over connections 44 and 49. These signals are applied to the input terminals of AND gate 740 thereby to develop an output signal which will enable gates 731 through 736 to respond to signals applied to the other two input terminals of each gate.

In this supervisory function, as in the mold function, the linecaster switches are interrogated separately and the particular switch to be interrogated is determined by the configuration of the signals applied to the circuits Y1, Y2 and Y4 of the cable 43. Such signals in turn determine which of the AND gates 411–416 of flag scanner 70 (FIG. 4) will produce a logical one signal on its output. The resulting signal is transmitted over the proper lead of cable 75 to the circuit of FIG. 7. Thus, if the configuration of the signals on leads 41, 42, 44 corresponds to linecaster No. 1, a logical one output signal will be produced by AND gate 411 and transmitted over lead 75.1 of cable 75 to be impressed on the center input terminal of AND gate 731. As a result of this signal and the output signal from AND gate 740, AND gate 731 will be enabled, thereby to test the condition of the linecaster No. 1 switch as transmitted over connection 721 from switch 711.

If at this time, switch 711 is in its upper position as shown, a logical one signal will also be transmitted over the 721 connection to AND gate 731 and a logical one signal will appear at the output lead 741 of the gate and be transmitted through OR gate 750 over the connection 751 to control unit 3 to be stored in the temporary storage bit assigned for the purpose. Similarly, as scanner 70 is stepped from stage to stage, the condition of the "stop at end of take" switches of the successive linecasters will be sampled and the resulting information transmitted to the control unit.

Although the operation of the present invention has been described above in conjunction with a composing machine of the hot metal linecasting variety, it is to be understood that the present invention can be employed to operate other machines that compose from a coded input. For example, high speed photocomposition devices such as the Photon "Zip," Radio Corporation of America "Videocomp," and Mergenthaler "Linotron" may be operated from the control system of this invention. Further, in operating certain composing machines, it may be necessary to use so-called solid state devices, rather than relays such as those shown in the linecaster buffer circuit in FIG. 5, to transfer information to the composing machine, but the substitution of solid state devices for relays will be obvious to those skilled in the art.

The terms and expressions that have been employed herein are used as terms of description and not of limitation, and there is no intention in the use of such terms and expressions to exclude any equivalents of the features shown and described or portions thereof, but it is recognized that various modifications are possible within the scope of the invention claimed.

What is claimed is:

1. A composing machine control system which comprises
   a central station including
   a data processor provided with means for storing coded signals representing the characters of each of a plurality of takes,
   a plurality of remote publishing stations, and
   transmission means connecting said central station with each of said publishing stations,
   each of said publishing stations being provided with
   a plurality of composing machines for composing characters from said coded signals, each composing machine having means for generating a flag signal to indicate that said composing machine is ready to compose the next character,
   a control unit including means for storing a selected number of said coded signals representing characters of a selected portion of a take for each of said composing machines at said publishing station,
   and an interface circuit interposed between and connected to said control unit and said composing machines,
   wherein said control unit supplies coded signals via said interface circuit for said corresponding ones of composing machines which have generated said flag signals, and
   wherein a portion of a take stored for each composing machine comprises a first group of characters to be supplied to such composing machine and a second group of characters supplied from said central station data processor while said composing machine is composing said first group of characters.

2. In a composing machine control system in which coded signals representing the characters of each of a plurality of takes are transmitted from a central station to each of a plurality of remote publishing stations, each remote publishing station comprising
   a plurality of composing machines for composing characters from said coded signals, each composing machine being provided with means for generating a flag signal to indicate that said composing machine is ready to compose the next character,
   a control unit for storing a predetermined number of said coded signals representing characters of selected portions of said takes for said composing machines, and for transferring said coded signals to said composing machines which have generated flag signals, and an interface circuit interposed between said control unit and said composing machines, wherein said control unit supplies coded signals via said interface circuit for said corresponding ones of composing machines which have generated said flag signals, and wherein a portion of a take stored for each composing machine comprises a first group of characters to be supplied to such composing machine and a second group of characters supplied from said central station data processor while the composing machine is composing said first group of characters.

3. In a composing machine control system in which coded signals representing the characters of each of a plurality of takes are transmitted from a central station to each of a plurality of remote publishing stations, each remote publishing station including a plurality of composing machines and a control unit for storing a selected number of said coded signals representing predetermined portions of said takes for said plurality of composing machines located at each remote publishing station and for transferring said stored coded signals to said composing machines, and an interface circuit interposed between and connected to said control unit and said plurality of composing machines, said interface circuit comprising a plurality of buffer means in one-to-one correspondence with said composing machines, each buffer means including a flag register for storing flag signals generated by each of said composing machines to indicate that said composing machine is ready to compose the next character, a character register for storing said coded signals representing the next characters to be composed by said composing machines that have generated flag signals, means responsive to a flag signal stored in said flag register for transferring from said control unit to said character register said coded signals representing the next characters to be composed, and means responsive to said coded signals stored in said character register for operating said composing machines that are ready to compose the next character, a plurality of gating means, one for each of said composing machines, for storing said flag signals from said corresponding composing machines, scanning means responsive to a succession of scanning signals generated by said control unit to determine which of said gating means has stored a flag signal, and selector means simultaneously responsive with said flag scanning means to said succession scanning signals to direct said stored coded signals to the buffer means corresponding to the composing machine which generated a flag signal.

4. In combination with the apparatus defined in claim 3, means for establishing an indication that there are no more coded signals for any one of said composing machines which comprises a plurality of binary storage devices in one-to-one correspondence with said plurality of composing machines, each storage device being provided with a set terminal, a reset terminal, and an output terminal, a plurality of relays each associated with a corresponding one of said storage devices, each of said relays being provided with an operating winding and a pair of contacts arranged to be closed by the operation of the relay, means for connecting the output terminal of each storage device to the operating winding of its associated relay, a plurality of indicator means, one for each of said relays, so that the operation of a relay energizes said corresponding indicator means, means for connecting each of said indicator means to one of the contacts of said corresponding relay, a source of energy connected in common to the other contact of all of said relays, means responsive to said control unit and said flag scanning means, and connected in common to the reset terminals of all of said binary storage devices, for resetting all of said binary storage devices in the absence of coded signals for at least one of said composing machines, a plurality of gating means enabled by said selector means, each gating means corresponding to one of said composing machines and provided with an output terminal connected to the set terminal of a corresponding one of said binary storage devices, and a plurality of leads for connecting each gating means to said control unit, so that a signal generated by said control unit to indicate the absence of any more coded signals for one of said composing machines is conveyed by a corresponding one of said leads to said corresponding gating means to set said corresponding binary storage device, operate said corresponding relay and energize said corresponding indicator means.

5. In an interface circuit for interconnecting a plurality of composing machines with a control unit so that $n$ digit binary charatcer signals stored in said control unit are selectively supplied to said composing machines in response to requests from said composing machines, buffer means individually associated with each of said composing machines for delivering to said associated composing machines the individual binary digits of said character signals in response to said requests from said composing machines, which comprises a plurality of $n$ binary storage devices each corresponding to one of the $n$ binary digits of each of said character signals, each of said storage devices being provided with a set terminal, a reset terminal, and an output terminal, a plurality of $n$ gating means each of which is associated with one of the $n$ binary digits of said character signals and with a corresponding one of said storage devices, and each of which is provided with an input terminal, a control terminal, and an output terminal, means for connecting the output terminal of each of said gating means to the set terminal of the corresponding storage device, means for applying the individual binary digits of said selected character signal to the input terminals of the associated gating means, a plurality of $n$ relays, each of which is associated with one of the $n$ binary digits of said character signals and with a corresponding one of said storage devices, each of said relays being provided with an operating winding and contacts arranged to be closed by the operation of the relay, means for connecting the output terminal of each of said storage devices to the winding of the associated relay, means responsive to the closing of the contacts of any of said relays for establishing an operating circuit for the control of the corresponding composing machine, a source of an enabling signal which is supplied to that one of said composing machines which has made a request for a character signal, and means for applying said enabling signal to the control terminals of all of said gating means to enable said gating means and thereby pass said binary digits of said selected character signal to place in the set condition selected ones of said storage devices corresponding to digits which are in a specified one of the two binary states wherein the setting of selected ones of said storage devices energizes the windings of corresponding ones of said relays to close the contacts of said energized relays, thereby to establish said operating circuit by completing a group of corresponding electrical paths in said operating circuit to cause said composing machine to compose a predetermined character.

6. In combination with the apparatus defined in claim 5, an $(n+1)$th binary storage device for signalling to said control unit a request from said associated composing machine for a character signal, said $(n+1)$th storage device being provided with a set terminal, and an output terminal, means for conveying a request from said associated composing machine to said set terminal of said $(n+1)$th storage device so that said storage device is placed in the set condition to indicate that the associated composing machine has made a request for a character signal, and to said reset terminals of said $n$ storage devices to place said $n$ storage devices in the reset condition in preparation for the next character signal from said control unit, and means for connecting said source of an enabling signal to said reset terminal of said $(n+1)$th storage device is placed in the reset condition upon the delivery of said character signal to said composing machine.

7. In combination with the apparatus defined in claim 6, an interlock circuit associated with the main operating circuit of each composing machine and selectably controlled to render the associated composing machine operative and inoperative, which comprises an $(n+2)$th storage device provided with a set terminal, a reset terminal, and an output terminal, a relay associated with said $(n+2)$th storage device and provided with an operating winding and contacts arranged to be closed by the operation of said relay, means for connecting said contact between first and second points in said operating circuit of said composing machine so that said composing machine is rendered operative by the completion of an electrical path between said first and second points via the closing of said contacts in response to the operation of said relay, and so that said composing machine is rendered inoperative by the breaking of an electrical path between said first and second points via the opening of said contacts in response to the release of said relay, means for connecting the output terminal of said $(n+2)$th storage device to said winding of said relay, means for conveying said request from said associated composing machine to said reset terminal of said $(n+2)$th storage device to place said $(n+2)$th storage device in the reset condition and thereby render said composing machine inoperative upon the receipt of said request, a gating means provided with an output terminal, a control terminal, and an input terminal, means for connecting the output terminal of said gating means to said set terminal of said $(n+2)$th storage device, means for applying said enabling signal to said control terminal of said gating means, and means for connecting said input terminal of said gating means to said control unit to receive a command signal so that said $(n+2)$th storage device is placed in the set condition and the composing machine is rendered operative while the enabling signal and the command signal are respectively applied at the same time to the control and input terminals of said gating means.

8. In a composing machine control system in which coded signals representing the characters of each of a plurality of takes are transmitted from a central station to each of a plurality of remote publishing stations, each remote publishing station including a plurality of composing machines, a control unit, and an interface circuit interposed between and connected to said composing machines and said control unit, means located at a remote publishing station for conveying to said control unit the position of the mold disk for each of said composing machines, which comprises scanning means responsive to a succession of scanning signals from said control unit to generate a sequence of indicator signals each corresponding to one of said composing machines, a multiple position switch associated with each composing machine and provided with a plurality of contacts, each position of said switch and one of said contacts corresponding to each mold position of the associated composing machine, a plurality of sensor circuits, one for each of said mold positions, each sensor circuit including a plurality of gating means corresponding to said plurality of composing means, each gating means being provided with two control terminals, an input terminal, and an output terminal, means for connecting said control unit to one of said control terminals of each gating means to enable simultaneously all of said gating means in response to command signals from said control unit, means for connecting said scanning means to said plurality of sensor circuits so that the indicator signal corresponding to each composing machine is applied to the second control terminal of the corresponding gating means in each sensor circuit, means for connecting each contact of each switch to the input terminal of the gating means corresponding to the composing machine with which said switch is associated, and means for connecting the output terminals of said plurality of gating means to said control unit.

9. In a composing machine in which coded signals representing the characters of each of a plurality of takes are transmitted from a central station to each of a plurality of remote publishing stations, each remote publishing station including a plurality of composing machines, a control unit, and an interface circuit interposed between and connected to said composing machines and said control unit, means located at a remote publishing station for determining whether any of said composing machines are to be taken out of operation at the end of the take being composed, which comprises scanning means responsive to a succession of scanning signals from said control unit to generate a sequence of indicator signals each corresponding to one of said composing machines, a plurality of switches each associated with one of said composing machines, each switch having two positions and two contacts, a first position and a first contact for stopping the associated composing at the end of a take, and a second position and a second contact for keeping the machine in operating condition at the end of a take.

a plurality of gating means corresponding to said plurality of composing machines, each gating means being provided with two central terminals, an input terminal, and an output terminal, means for connecting said control unit to one of said control terminals of each gating means to enable simultaneously all of said gating means in response to command signals from said control unit, means for connecting said scanning means to said other control terminals of said plurality of gating means so that the indicator signal corresponding to each composing machine is applied to the other control terminal of the gating means associated with the same composing machine, means for connecting the first contact of each switch to the input terminal of the gating means corresponding to the composing machine with which said switch is associated, and means for connecting the output terminals of said plurality of gating means to said control unit.

10. A composing machine control system which comprises a central station including a data processor provided with means for storing $n$ digit binary coded signals representing the characters of each of a plurality of takes, a plurality of remote publishing stations, and transmission means connecting said central station with each of said publishing stations, each of said publishing stations being provided with a plurality of composing machines for composing characters from said character signals, each composing machine having means for generating a flag signal to indicate that said composing machine is ready to compose the next character, a control unit including means for storing a selected number of said character signals representing characters of a selected portion of a take for each of said composing machines at said publishing station, an interface circuit interconnecting said control unit and said composing machines so that said character signals stored in said control unit are selectively supplied to said composing machines in response to requests from said composing machines, said interface circuit including a plurality of buffer means individually associated with a corresponding one of said composing machines for delivering to said associated composing machines the individual binary digits of said character signals in response to said requests from said composing machines, each buffer means including a plurality of $n$ binary storage devices each corresponding to one of the $n$ binary digits of each of said character signals, each of said storage devices being provided with a set terminal, a reset terminal, and an output terminal, a plurality of $n$ gating means each of which is associated with one of the $n$ binary digits of said character signals and with a corresponding one of said storage devices, and each of which is provided with an input terminal, a control terminal, and an output terminal, means for connecting the output terminal of each of said gating means to the set terminal of the corresponding storage device, means for applying the individual binary digits of said selected character signal to the input terminals of the associated gating means, a plurality of $n$ relays, each of which is associated with one of the $n$ binary digits of said character signals and with a corresponding one of said storage devices, each of said relays being provided with an operating winding and contacts arranged to be closed by the operation of the relay, means for connecting the output terminal of each of said storage devices to the winding of the associated relay, means responsive to the closing of the contacts of any of said relays for establishing an operating circuit for the control of the corresponding composing machine, a source of an enabling signal which is supplied to that one of said composing machines which has made a request for a character signal, means for applying said enabling signal to the control terminals of all of said gating means to enable said gating means and thereby pass said binary digits of said selected character signal to place in the set condition selected ones of said storage devices corresponding to digits which are in a specified one of the two binary states, wherein the setting of selected ones of said storage devices energizes the windings of corresponding ones of said relays to close the contacts of said energized relays, thereby to establish said operating circuit by completing a group of corresponding electrical paths in said operating circuit to cause said composing machine to compose a predetermined character, an $(n+1)$th binary storage device for signaling to said control unit a request from said associated composing machine for a character signal, said $(n+1)$th storage device being provided with a set terminal, and an output terminal, means for conveying a request from said associated composing machine to said set terminal of said $(n+1)$th storage device so that said storage device is placed in the set condition to indicate that the associated composing machine has made a request for a character signal, and to said reset terminals of said $n$ storage devices to place said $n$ storage devices in the reset condition in preparation for the next character signal from said control unit, means for connecting said source of an enabling signal to said reset terminal of said $(n+1)$th storage device is placed in the reset condition upon the delivery of said character signal to said composing machine, and an interlock circuit associated with the main operating circuit of each composing machine and selectably controlled to render the associated composing machine operative and inoperative, which comprises an $(n+2)$th storage device provided with a set terminal, a reset terminal, and an output terminal, a relay associated with said $(n+2)$th storage device and provided with an operating winding and contacts arranged to be closed by the operation of said relay, means for connecting said contact between first and second points in said operating circuit of said composing machine so that said composing machine is rendered operative by the completion of an electrical path between said first and second points via the closing of said contacts in response to the operation of said relay, and so that said composing machine is rendered inoperative by the breaking of an electrical path between said first and second points via the opening of said contacts in response to the release of said relay, means for connecting the output terminal of said $(n+2)$th storage device to said winding of said relay, means for conveying said request from said associated composing machine to said reset terminal of said $(n+2)$th storage device to place said $(n+2)$th storage device in the reset condition and thereby render said composing machine inoperative upon the receipt of said request, a gating means provided with an output terminal, a control terminal, and an input terminal, means for connecting the output terminal of said gating means to said set terminal of said $(n+2)$th storage device, means for applying said enabling signal to said control terminal of said gating means, and means for connecting said input terminal of said gating means to said control unit to receive a command signal so that said $(n+2)$th storage device is placed in the set condition and the composing machine is rendered operative while the enabling signal and the command signal are respectively applied at the same time to the control and input terminals of said gating means, a plurality of gating means, one for each of said composing machines, for storing said flag signals from said corresponding composing machines, scanning means responsive to a succession of scanning signals generated by said control unit to determine which of said gating means has stored a flag signal, and selector means simultaneously responsive with said flag scanning means to said succession scanning signals to direct said stored coded signals to the buffer means corresponding to the composing machine which generated a flag signal, means for establishing an indication that there are no more character signals for any one of said composing machines which comprises a plurality of binary storage devices in one-to-one correspondence with said plurality of composing machines, each storage device being provided with a set terminal, a reset terminal, and an output terminal, a plurality of relays each associated with a corresponding one of said storage devices, each of said relays being provided with an operating winding and a pair of contacts arranged to be closed by the operation of the relay, means for connecting the output terminal of each storage device to the operating winding of its associated relay, a plurality of indicator means, one for each of said relays, so that the operation of a relay energizes said corresponding indicator means, means for connecting each of said indicator means to one of the contacts of said corresponding relay, a source of energy connected in common to the other contact of all of said relays, means responsive to said control unit and said flag scanning means, and connected in common to the reset terminals of all of said binary storage devices, for resetting all of said binary storage devices in the absence of character signals for at least one of said composing machines, a plurality of gating means enabled by said selector means, each gating means corresponding to one of said composing machines and provided with an output terminal connected to the set terminal of a corresponding one of said binary storage devices, and a plurality of leads for connecting each gating means to said control unit, so that a signal generated by said control unit to indicate the absence of any more character signals for one of said composing machines is conveyed by a corresponding one of said leads to said corresponding gating means to set said corresponding binary storage device, operate said corresponding relay and energize said corresponding indicator means, means for conveying to said control unit the position of the mold disk for each of said composing machines, which comprises scanning means responsive to a succession of scanning signals from said control unit to generate a sequence of indicator signals each corresponding to one of said composing machines, a multiple position switch associated with each composing machine and provided with a plurality of contacts, each position of said switch and one of said contacts corresponding to each mold position of the associated composing machine, a plurality of sensor circuits, one for each of said mold positions, each sensor circuit including a plurality of gating means corresponding to said plurality of composing means, each gating means being provided with two control terminals, an input terminal, and an output terminal, means for connecting said control unit to one of said control terminals of each gating means to enable simultaneously all of said gating means in response to command signals from said control unit, means for connecting said scanning means to said plurality of sensor circuits so that the indicator signal corresponding to each composing machine is applied to the second control terminal of the corresponding gating means in each sensor circuit, means for connecting each contact of each switch to the input terminal of the gating means corresponding to the composing machine with which said switch is associated, and means for connecting the output terminals of said plurality of gating means to said control unit, and means for determining whether any of said composing machines are to be taken out of operation at the end of the take being composed, which comprises scanning means responsive to a succession of scanning signals from said control unit to generate a sequence of indicator signals each corresponding to one of said composing machines, a plurality of switches each associated with one of said composing machines, each switch having two positions and two contacts, a first position and a first contact for stopping the associated composing at the end of a take, and a second position and a second contact for keeping the machine in operating condition at the end of a take, a plurality of gating means corresponding to said plurality of composing machines, each gating means being provided with two central terminals, an input terminal, and an output terminal, means for connecting said control unit to one of said control terminals of each gating means to enable simultaneously all of said gating means in response to command signals from said control unit, means for connecting said scanning means to said other control terminals of said plurality of gating means so that the indicator signal corresponding to each composing machine is applied to the other control terminal of the gating means associated with the same composing machine, means for connecting the first contact of each switch to the input terminal of the gating means corresponding to the composing machine with which said switch is associated, and means for connecting the output terminals of said plurality of gating means to said control unit.

References Cited

UNITED STATES PATENTS 2,846,055   8/1958   Ackell.

HAROLD PITTS, Primary Examiner

U.S. Cl. X.R.

199—18; 340—147, 152, 166, 167

PO-1050
(5/69)

UNITED STATES PATENT OFFICE
CERTIFICATE OF CORRECTION

Patent No. 3,509,538      Dated April 28, 1970

Inventor(s) G.W. HOLDEN ET AL.

It is certified that error appears in the above-identified patent and that said Letters Patent are hereby corrected as shown below:

Col. 3, line 19,   "finger" should be --fingers--

Col. 3, line 62,   "accompanyig" should be --accompanying--

Col. 4, line 71,   "stoarge" should be --storage--

Col. 8, line 5,   "there will be no flag signal on the input" should read --the lead Y1 will have a binary one signal,"

Col. 8, line 12,   "wil lbe" should be --will be--

Col. 13, line 41, "There" should be --These--

Col. 14, lines 24 through 30 should be omitted.

Col. 16, line 32, "charatcer" should be --character--

Col. 18, line 63, "take." should be --take,--

SIGNED AND
SEALED

SEP 29 1970

(SEAL)
Attest:

Edward M. Fletcher, Jr.
Attesting Officer

WILLIAM E. SCHUYLER, JR.
Commissioner of Patents